United States Patent
Beyersdorfer (10) Patent No.: US 10,481,172 B2
(45) Date of Patent: Nov. 19, 2019

(54) SENSOR AND METHOD FOR PRODUCING A SENSOR

(71) Applicant: Robert Bosch GmbH, Stuttgart (DE)

(72) Inventor: Jan Beyersdorfer, Foertha (DE)

(73) Assignee: Robert Bosch GmbH, Stuttgart (DE)

( * ) Notice: Subject to any disclaimer, the term of this patent is extended or adjusted under 35 U.S.C. 154(b) by 344 days.

(21) Appl. No.: 15/378,542

(22) Filed: Dec. 14, 2016

(65) Prior Publication Data

US 2017/0184624 A1 Jun. 29, 2017

(30) Foreign Application Priority Data

Dec. 23, 2015 (DE) .................. 10 2015 226 605

(51) Int. Cl.
| | |
|---|---|
| *G01P 3/44* | (2006.01) |
| *G01P 1/00* | (2006.01) |
| *G01P 1/02* | (2006.01) |

(52) U.S. Cl.
CPC .................. *G01P 3/44* (2013.01); *G01P 1/00* (2013.01); *G01P 1/026* (2013.01)

(58) Field of Classification Search
CPC ............... G01P 3/44; G01P 1/026; G01P 1/00
See application file for complete search history.

(56) References Cited

U.S. PATENT DOCUMENTS

2012/0210786 A1* 8/2012 Steinbrink ............ H04L 1/0015
73/431

FOREIGN PATENT DOCUMENTS

| DE | 10 2008 042 091 A1 | 6/2009 | |
|---|---|---|---|
| WO | WO-2009071390 A2 * | 6/2009 | ........... G01D 11/245 |

* cited by examiner

*Primary Examiner* — Justin Seo
*Assistant Examiner* — John M Royston
(74) *Attorney, Agent, or Firm* — Maginot, Moore & Beck LLP (57) ABSTRACT

A sensor includes a sensor core, a deviating component, and an aligning component. The sensor core has a cable that leaves the sensor core in essentially an exit direction, and a counter-structure. The aligning component has an aligning structure adapted to the counter-structure. The deviating component and aligning component define a final alignment of the cable in a direction different than the exit direction. The deviating component is pushed onto the sensor core. The aligning component is pushed laterally onto the sensor core in a mounting direction relative to the sensor core, and is engaged with the counter-structure of the sensor core.

17 Claims, 5 Drawing Sheets

SENSOR AND METHOD FOR PRODUCING A SENSOR

This application claims priority under 35 U.S.C. § 119 to patent application no. DE 10 2015 226 605.2, filed on Dec. 23, 2015 in Germany, the disclosure of which is incorporated herein by reference in its entirety.

BACKGROUND

Published patent application DE 10 2008 042 091 relates to a method for producing a magnetic field sensor and a sensor manufactured by the proposed method, in particular a rotation speed and/or rotation direction sensor for wheel rotation or for the drive train of a motor vehicle. In this case, an electrical module of the sensor together with a connection cable is encapsulated with plastic by means of injection molding, and a fastening tab is simultaneously molded on, the connection cable being bent in an angular position with respect to the overmolded module after the molding process, and being positioned and retained in this position in the same manufacturing process.

SUMMARY

The sensor according to the disclosure comprises a sensor core having a cable which leaves the sensor core essentially in an exit direction. The sensor core furthermore has a counter-structure. The sensor furthermore comprises a deviating component and an aligning component, which has an aligning structure adapted to the counter-structure.

A final alignment of the cable is established differently from the exit direction by means of the deviating component and the aligning component. To this end, the deviating component is pushed onto the sensor core, and is in engagement with the sensor core. The aligning component is pushed laterally onto the sensor core in a mounting direction with respect to the sensor core, the aligning structure of the aligning component being in engagement with the counter-structure of the sensor core. Such a deviating component may also be understood as a cap, and the aligning component as a type of clip. The sensor core may for example be a sensor which is based on a magnetic measuring principle, for example a rotation speed sensor, such as is used to determine a wheel rotation speed in vehicles. Other sensor types are of course possible.

The sensor according to the disclosure has the advantage that it is very modular. The cap and the clip may be provided as standard parts. By installing the sensor with a suitable arrangement of the cap and the clip, it is possible to establish a final alignment of the cable on the finished sensor. Because the clip is pushed on in a mounting direction, in which case the mounting can selectively be carried out from different directions, a multiplicity of possible cable alignments can be reached. Since different working tasks and/or working positions for such sensors may be required, with the same sensor core a multiplicity of cable orientations, and therefore a multiplicity of final sensors, can be made possible. In particular, it is possible to select a cable direction which is suitably adjusted for the existing alignment of a fastening element of the sensor core.

Furthermore, it is advantageous that parts which are in engagement with one another—sensor core, cap and clip—are capable of absorbing tensile forces on the cable and therefore of making the sensor insensitive to mechanical loads, particularly to tension on the cable.

The advantages mentioned here also apply for the production method according to the disclosure.

The claims relate to further advantageous configurations of the disclosure.

It is advantageous for the aligning component to be pushed on in a mounting direction, the final alignment of the cable depending on an angle of the mounting direction about the exit direction of the cable. By mounting the aligning component at an angle about the cable, the suitable direction of the final cable alignment can be selected. By selecting an alignment, the counter-structure and the aligning structure are also correspondingly brought into engagement with the corresponding angle.

In one configuration of the sensor, the angle of the final alignment of the cable about the exit direction corresponds to the angle of the mounting direction of the aligning component about the cable.

In another configuration, the sensor core comprises a fastening element, which is provided at a fastening angle about the exit direction of the cable. The angle of the final alignment about the exit direction of the cable is establishable in relation to the fastening element, particularly in relation to the fastening angle, by the mounting direction of the aligning component. A fastening element, for example a tab, is an integral component of the sensor core, or at least firmly connected thereto. It is advantageous that, with such a tab which is installed/present on the sensor core at a particular angle, or a particular orientation, it is possible to adjust a final alignment of the cable in relation to the fastening tab by selection of a mounting direction. This increases the modularity of the sensor, since the sensor can be manufactured in such a way that the final alignment of the cable can be adapted to the installation position.

In one advantageous configuration, the cable has an annular collar which is held by recesses of the deviating component and of the aligning component for fixing the cable. The recess of the deviating component and the recess of the aligning component may fully enclose the cable and the annular collar. In this way, a force which acts on the cable can be dissipated into the components holding the cable, so that tensile relief can be achieved.

In one advantageous configuration of the sensor, the deviating component has a seat, by means of which the deviating component is at least partially in engagement with a second ring of the sensor core. The second ring of the sensor core is formed around the cable at a first end of the sensor core. In this way, the deviating component can advantageously be arranged on the sensor core and positioned there correctly. Furthermore, by engagement with the second ring, tensile forces affecting the cable can again be dissipated into the sensor core. The second ring lies on the end of the sensor where the cable also leaves the sensor core. The deviating component can therefore also be placed close to the cable exit.

Advantageously, a deviation angle of the cable with respect to the exit direction is established by arrangement of the recess of the deviating component in relation to the guide. If an angle of 90° is intended to be achieved between the cable exit and the final cable alignment, for example, then the deviating component needs to be configured in such a way that the opening which subsequently holds the annular collar is arranged at an angle of 90° with respect to the side of the deviating component from which the cable enters the deviating component. An alternative angular configuration is possible, although in this case the aligning component may possibly also need to be adapted accordingly.

For the modularity of the sensor, it is advantageous that the aligning structure of the aligning component and the counter-structure of the sensor core allow arrangement in a plurality of mounting directions. This is possible, for example, with a star/counter-star structure which makes an arrangement in a plurality of rotation positions of the aligning component with respect to the sensor core possible.

In order to increase the load-bearing capacity of the sensor, particularly in relation to tensile forces in different directions, the deviating component and the aligning component are connected to one another by connecting means, in particular latched to one another. This also increases the stability of the sensor.

It is furthermore advantageous for the aligning component to have a first seat for a first ring of the sensor core, by means of which the aligning component is at least partially in engagement with the first ring of the sensor core. Furthermore, the aligning component has a second seat for the second ring of the sensor core. The aligning component is at least partially in engagement with the second ring of the sensor core. These engagements of the sensor core with the aligning component increase the stability of the sensor, particularly in relation to tensile forces on the cable.

In one advantageous configuration, the first ring of the sensor core is formed around the cable between the counter-structure and the second ring. In this way, the aligning component and the deviating component can be arranged correspondingly, particularly in the correct spatial sequence along the cable.

In another configuration, the deviating component has rails along the mounting direction, and the aligning component has corresponding guides for the rails, which are in engagement with one another in the assembled state of the sensor. This again increases the stability of the sensor, particularly when force is introduced via the cable. Furthermore, positioning of the two components with respect to one another by guides and rails is more straightforwardly possible.

DETAILED DESCRIPTION

Figure 1:
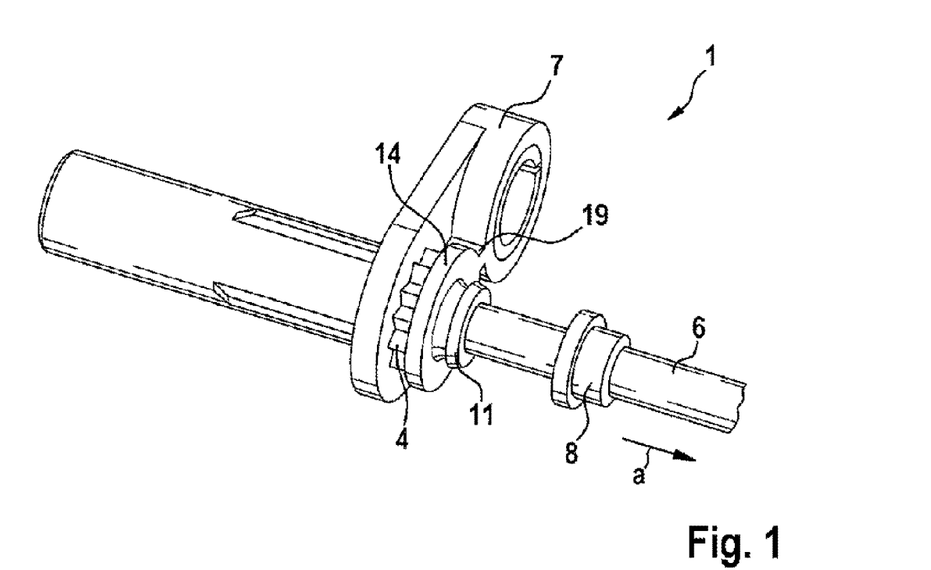
FIG. 1 shows a sensor core with a fastening tab.

FIG. 1 shows a sensor core 1 with a cable 6. The cable 6 leaves the sensor core 1 in an exit direction a. The exit direction a is indicated as an arrow in FIG. 1. In the embodiment shown here, the exit direction a is parallel to a longitudinal axis of the sensor 1. The sensor core 1 has a fastening tab 7. With the fastening tab 7, the sensor 1 can be installed in a vehicle. A rivet or a screw may be inserted/screwed through an opening in the fastening tab 7, for example, and the sensor core 1 can thus be fixed on a further component of a vehicle.

An annular collar 8, by means of which the cable 6 can be held, is fitted on the cable 6 of the sensor core 1. In particular, the cable 6 may be held by means of the annular collar 8 in a final alignment e which differs from the exit direction a. A representation of the final alignment may be found as an arrow with the marking e in FIG. 4.

The sensor core 1 has a counter-structure 4, which is formed around the cable 6 on the sensor core 1. The counter-structure 4 is structurally configured in such a way that it is suitable as a counter-structure 4 for an aligning structure 5 of an aligning component 3. Such an aligning component is represented in FIG. 3.

The sensor core 1 has a first ring 14, which is arranged in the exit direction a of the cable 6 in relation to the counter-structure 4. A second ring 11 is likewise arranged in the exit direction a of the cable 6 in relation to the counter-structure 4. The counter-structure 4, the first ring 14 and the second ring 11 are arranged offset with respect to one another along the exit direction a. The first ring 14 encloses the cable 6. The second ring 11 encloses the cable 6. The diameters of the first ring 14 and of the second ring 11 may be different. Between the first ring 14 and the second ring 11, there is a tapering of the sensor core 1 with a diameter smaller than the diameters of the first and second rings 14, 11.

Figure 3:
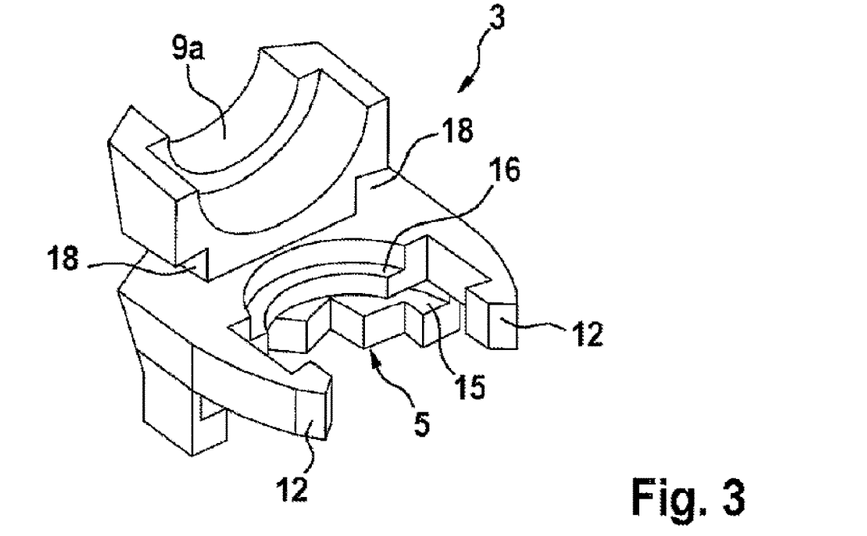
FIG. 3 shows an aligning component.

As represented in FIG. 3, in addition to the aligning structure 5, the aligning component 3 comprises a recess 9A, which is configured in such a way that the recess 9a can receive the annular collar 8 of the cable 6.

The aligning component 3 comprises fixing elements 12 for fixing on a further component. The fixing elements 12 are present in FIG. 3 in the form of latching lugs 12. The latching lugs 12 are resilient and can be bent outwards, so that a further component can be received between the latching lugs 12 and held by the latching lugs 12. The latching lugs 12 comprise a projection which can engage in a corresponding seat of the other component.

The aligning component 3 comprises a seat 15 for the first ring 14 of the sensor core 1. In the installed state, the first ring 14 and the seat 15 for the first ring 14 engage in one another.

Likewise, the aligning component 3 may comprise a seat 16 for the second ring 11 of the sensor core 1. The second ring 11 and the seat 16 for the second ring 11 are in engagement in the installed state.

The counter-structure 4 of the sensor 1 and the aligning structure 5 of the aligning component 3 are at least partially complementary to one another. Partially complementary means that a positive structure of the counter-structure 4 matches with a negative structure of the aligning structure 5, so that in a mounted state of the sensor the positive structure and the negative structure can engage. Partially complementary means that the counter-structure 4 may be configured to be longer along its circumference than the counter-structure 5 of the aligning component 3. For example, the counter-structure 4 may form a full circle along the circumference. Conversely, the aligning structure 5 may comprise only a part of a circle along the circumference, in particular a semicircle.

Figure 8:
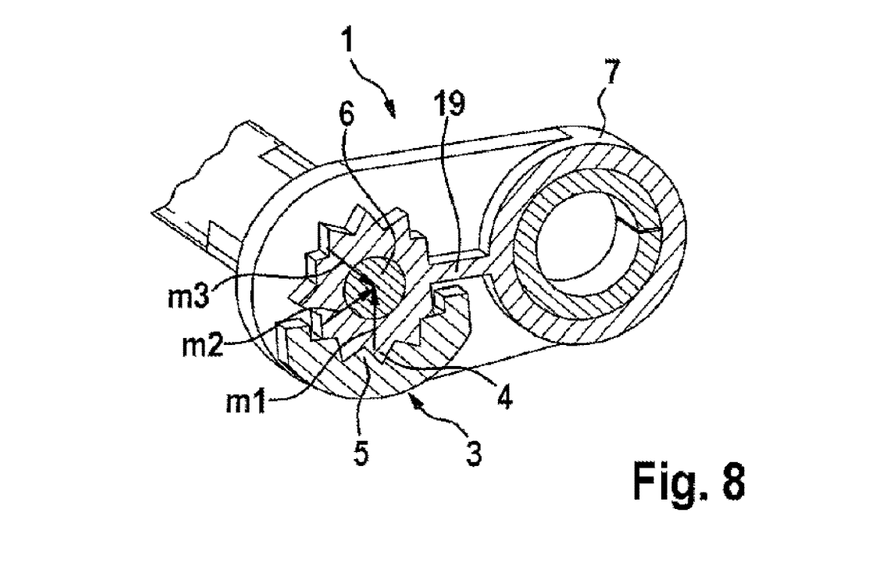
FIGS. 8-10 show sectional representations of the mounted sensor.

FIG. 8 shows a web 19 which is formed between the counter-structure 4 and the fastening tab 7. This web may on the one hand be present at the level of the counter-structure 4, although as an alternative it may also be offset with respect to the counter-structure along the axis of the sensor core 1. If the web 19 is arranged offset with respect to the counter-structure 4, the aligning structure 5 may be arranged, and brought into engagement with the counter-structure, in a plurality of positions completely around the cable 6. If, on the other hand, the web 19 is at the level of the counter-structure 4, then it is only possible to arrange the aligning structure 5 a few positions, which do not extend completely around the cable. The web 19 serves to stiffen the fastening tab 7 in relation to the sensor core 1. Positioning, as well as the dimensions of the fastening tab 7 on the sensor core, is naturally also to be taken into account for mounting, particularly for the directions available for mounting.

In FIG. 8, it can be seen that the counter-structure 4 may be a star structure, the aligning structure 5 being a negative star structure matching the counter-structure 4, or a counter-star structure.

Figure 2:
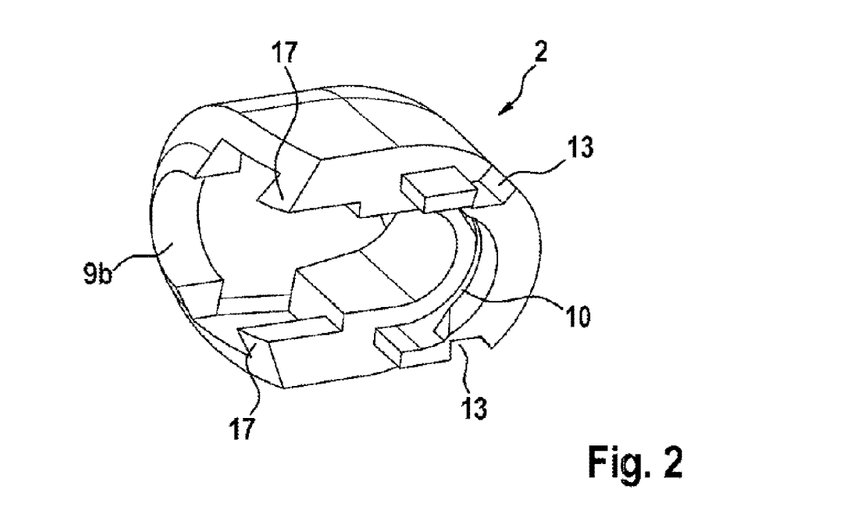
FIG. 2 shows a deviating component.

FIG. 2 shows a deviating component 2. The deviating component 2 has seats 13 corresponding with the latching lugs 12 of the aligning component 3. By latching the latching lugs 12 with the seats 13, the aligning component 3 and the deviating component 2 can be latched and thereby fixed with respect to one another.

The deviating component 2 comprises a recess 9b, which can receive the annular collar 8. The annular collar 8 may be held by the recess 9a of the aligning component 3 as well as by the recess 9b of the deviating component 2. The recesses 9a and 9b may enclose the annular collar 8 at least partially, and therefore hold the cable 6 in a final alignment e which differs from the exit alignment a of the cable 6.

The deviating component 2 may comprise a seat 10 for the second ring 11 of the sensor core 1. In the installed state, the second ring 11 of the sensor core 1 is in engagement with the seat 10 for the second ring 11.

The deviating component 2 may comprise rails 17. The rails 17 can be guided in guides 18, corresponding therewith, of the aligning component 3, and these are in engagement with one another in the installed state of the sensor. The rails 17 are configured as so-called dovetails in order to prevent them being able to detach themselves by widening outwards. The guides 18 are in the form of a groove.

The deviating component 2 defines a deviation of the cable 6 from the exit direction a of the cable into an alignment different therefrom. The recess 9b of the deviating component 2 is arranged on a different side of the deviating component 2 from the side of the deviating component 2 which comprises the seat 10 for the second ring 11. The site of the deviating component which comprises the seat 10 for the second ring 11 corresponds to the side on which the cable 6 enters the deviating component 2. The deviation of the cable 6 is brought about as a result of the fact that the cable 6 enters the deviating component on the side of the deviating component 2 which also comprises the seat 10 for the ring 11, and leaves the deviating component again 2 on the side on which the recess 9b is arranged. This may also be understood as meaning that the cable 6 is deviated through an angle θ with respect to the exit direction a of the cable 6 from the sensor core 1.

Figure 4:
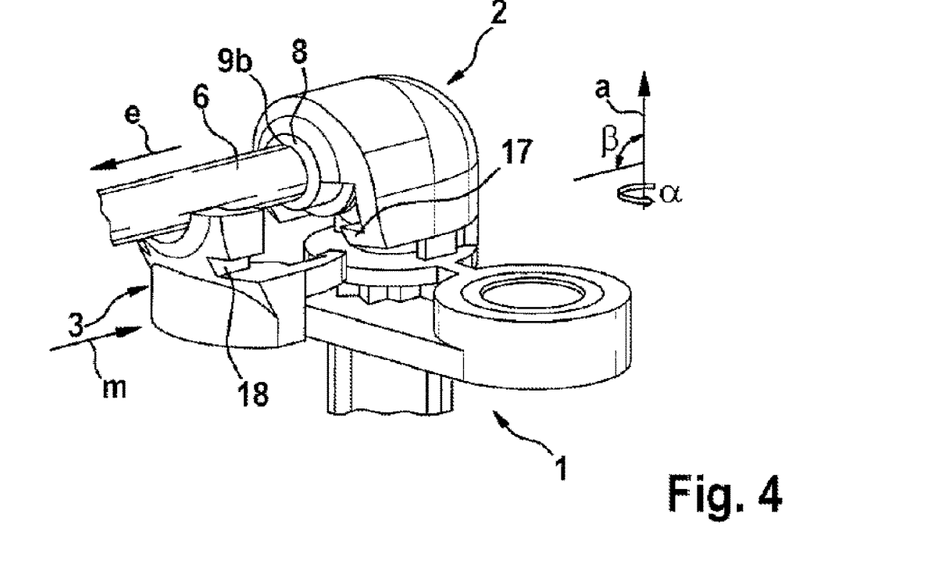
FIG. 4 shows the sensor core with an installed deviating component and an aligning component not yet finally mounted.

FIG. 4 shows an arrangement of the sensor core 1 with a deviating component 2 already installed. The deviating component 2 is in engagement with the sensor core 1. More precisely, the deviating component 2 receives the second ring 11 of the sensor core 1 by means of the seat 10, and is therefore in engagement with the sensor core 1.

The deviating component 2 receives the annular collar 8 in the seat 9b. In FIG. 4, it can be seen clearly that the cable 8 is angled in relation to the exit direction a. In FIG. 4, a final alignment e in which the cable 6 leaves the sensor is also indicated. The final alignment e, however, is not yet established definitively by the deviating component 2 alone. One degree of freedom remains open, namely the rotation about the longitudinal axis of the sensor core 1, which essentially corresponds to the exit direction a.

Indicated in FIG. 4 is the aligning component 3, which is pushed onto the sensor core 1 in a mounting direction m. The aligning component is, in particular, pushed laterally onto the sensor core in the mounting direction m. Pushing on laterally may, in particular, be understood as meaning that the aligning component is pushed onto the sensor core essentially at a right angle in relation to the exit direction a of the cable 6.

After having been pushed on from the mounting direction m, the aligning component 3 is in engagement with the deviating component 2. The engagement may be configured in the form of latching lugs 12, which latch with or clip into the seats 13 of the deviating component 2.

Furthermore, the guides 18 of the aligning component 3 engage with the corresponding rails 17 of the deviating component 2.

The aligning component 3 furthermore enters into engagement with the sensor core 1 by means of its seat 15 for the first ring 14 of the sensor core 1. Furthermore, the aligning component 3 enters into engagement with the sensor core 1 by means of its seat 16 for the second ring 11 of the sensor core 1.

After mounting, the recess 9a of the deviating component 2 and the recess 9b of the aligning component 3 enclose the cable and guide the annular collar 8.

The aligning structure 5 of the aligning component 3 enters into engagement with the counter-structure 4 of the sensor core.

For the case in which the aligning structure 4 and the counter-structure 5 are configured complementarily—at least partially—in the shape of a star, the aligning component may be pushed onto the sensor core 1 in a plurality of mounting directions m. By virtue of a configuration as a star structure 5 and star counter-structure 4, engagement of the aligning component 3 with the sensor core 1 can take place at a plurality of rotation angles α about the exit direction a of the cable 6.

In order to ensure engagement—as described—between deviating component 2 and aligning component 3 by means of rails 17, guides 18, latching lugs 12 and seats 13, the deviating component 2 must be arranged on the sensor core at an angle α matching with the mounting direction m. To this end, the deviating component 2 is fitted on the sensor core 1 so that it can be moved in rotation.

The deviation of the cable 6 by means of the deviating component 2 defines a first deviation angle β through which the cable 6 is deviated from the exit direction a. By mounting of the aligning component 3 at an angle α matching with the aligning structure 5, or the counter-structure 4, a second angle of the final alignment e is defined, so that the latter is established together with the deviation angle β.

Another representation of possible mounting directions m1, m2 and m3, in which the aligning component 3 can be pushed onto the sensor core 1, can be found in FIG. 8. In this sectional representation perpendicular to the exit direction a, it can be seen clearly that the aligning component 3 can be pushed onto the sensor core 1 in a plurality of possible alignments, of which m1-m3 are indicated by way of example.

The final alignment e of the cable 6 can be adjusted by means of the mounting direction m. It can be seen that, in particular, the final alignment of the cable in relation to the fastening tab 7 can be selected by means of the mounting direction m. As already described, depending on the positioning of the web 19 in relation to the counter-structure 4, particularly in relation to the positioning along the axis in the exit direction of the sensor core 1, the selection may in this case be restricted to available mounting directions. In other words, the number of possible mounting directions m may depend on the positioning of the web 19 in relation to the counter-structure 4 along the sensor core 1.

Likewise, the number of possible mounting directions m may depend on the position of the fastening tab 7 in relation to the counter-structure 4 along the sensor core 1. This is the case when a resulting overlap of components, for example of the aligning component 3 with the fastening tab 7, mechanically does not allow mounting in a mounting direction.

Figure 10:
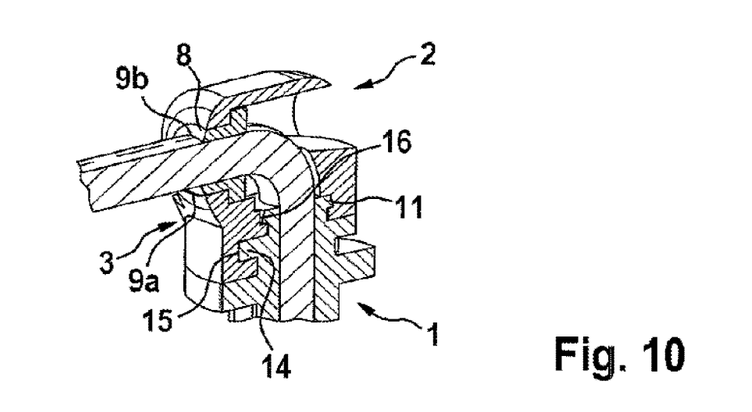

FIG. 10 shows, in a different sectional representation in the plane of the exit direction a and of the final alignment, the way in which the excursion component 3, the deviating component 2 and the sensor core 1 are in engagement with one another. This has already been described in the sections above.

Figure 9:
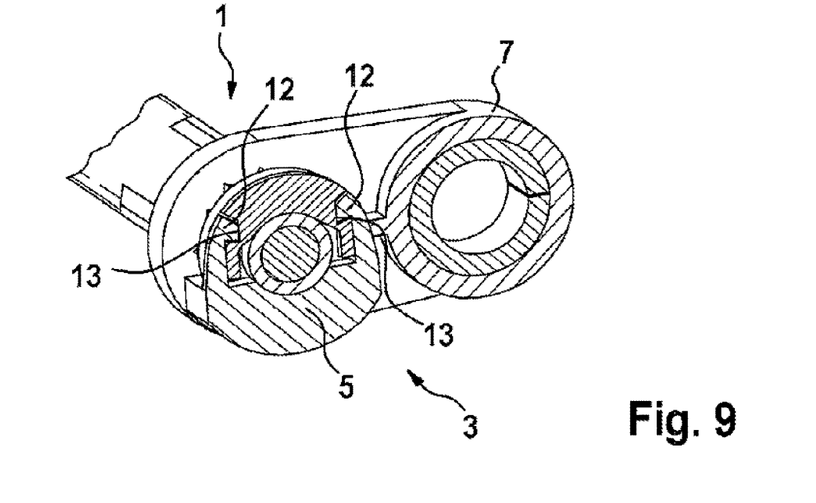

FIG. 9 is a further sectional representation perpendicular to the exit direction a of the cable 6, but above the counter-structure 4 in the direction of the cable exit. The section extends between the first ring 14 and the second ring 11. Here, the latching of the latching lugs 12 of the aligning component 3 with the seats 13 of the deviating component 2 is shown.

Figure 5:
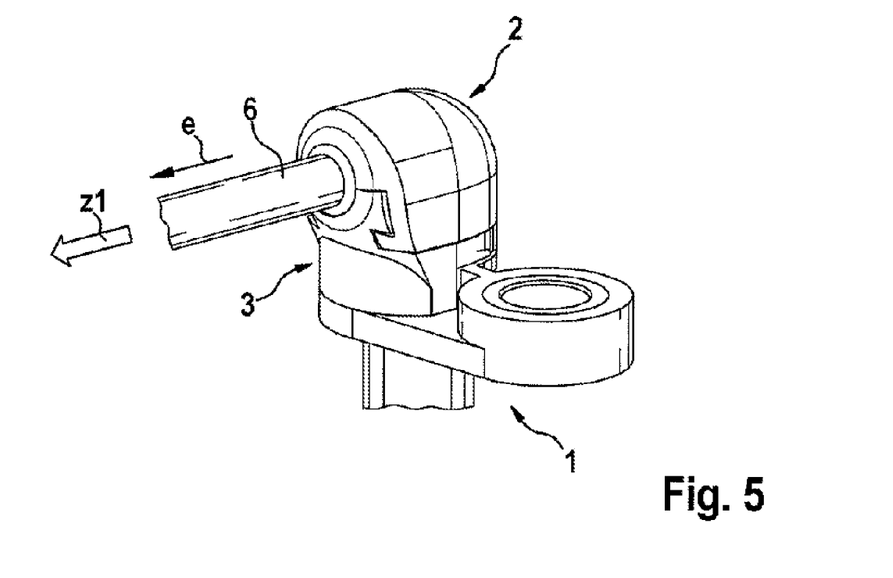
FIGS. 5-7 show the finally mounted sensor with the deviating and aligning components installed.
Figure 6:
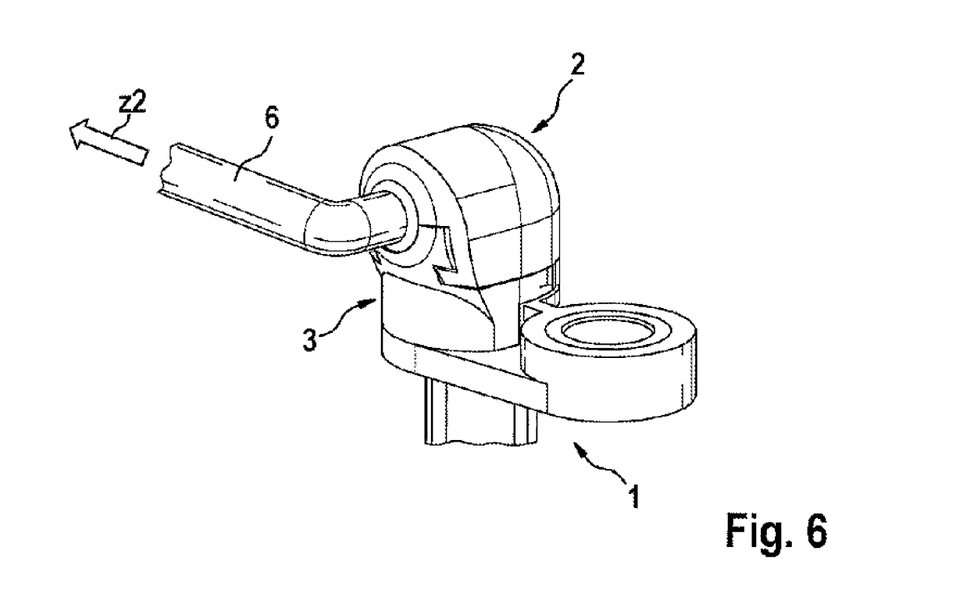
Figure 7:
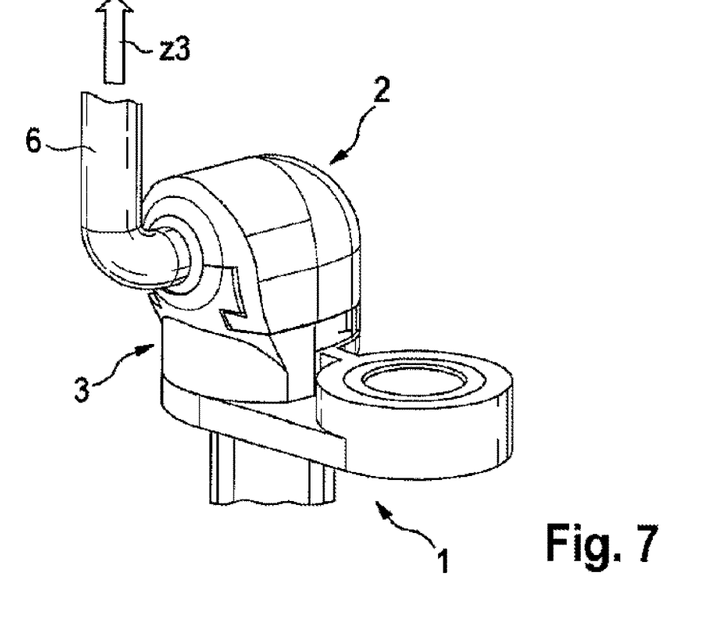

Interactions of the individual components, i.e. the deviating component 2, the aligning component 3 and the sensor core 1, will be illustrated again with the aid of FIGS. 5-7.

The aligning structure 5 and the counter-structure 4 prevent rotation of the components with respect to one another. The first ring 14 and the second ring 11 are used to fasten the mounted components. The aligning component 3 and the deviating component 2 mutually engage with the sensor core 1—in particular with the first ring 14, the second ring 11 and the counter-structure 4 of the sensor core 1—in such a way that tensile forces acting on the cable 6 can be absorbed.

Tensile forces from different directions are shown as $z1$, $z2$ and $z3$ on the sensor in FIGS. 5-7. The respective tensile forces $z1$-$z3$ from different directions are transmitted into the counter-structure 4, or into the first and second rings 14, 11 of the sensor core 1, by means of the deviating component 2 and the aligning component 3.

A tensile force from the direction $z1$ in FIG. 5 is transmitted into the deviating component 2 by means of the annular collar 8 of the cable 6 and by means of the opening 9b. From there, the force is transmitted into the sensor core by means of the seat 10 and the second ring 11. The rails 17 and guides 18 in this case ensure that the annular collar 8 cannot slip out of the openings 9a and 9b of the aligning component 3 and of the deviating component 2.

The tensile force $z2$ is transmitted into the sensor core 1 by means of a rotational lock. The rotational lock is formed by the aligning structure 5 and the counter-structure 4. In this case, the latching lugs 12 and the seats 13 are also jointly loaded, which ensures that the counter-structure 4 and the aligning structure 5 remain in engagement.

The tensile force $z3$ is transmitted into the deviating component 2 by the annular collar 8 by means of the opening 9b. From there, it is forwarded by means of the rails 17 and the guides 18 into the aligning component 3, from where it is dissipated by means of the seat 15 into the first ring 14 and the seat 16 into the second ring 11, and therefore into the sensor core 1. Here again, the latching lugs 12 and the seats 13 are jointly loaded in order to hold the deviating component 2 and the aligning component 3 together.

The tensile forces $z1$-$z3$ shown merely represent examples of possible tensile forces, which may naturally also be present in combinations of the tensile forces $z1$-$z3$.

Figure 11:
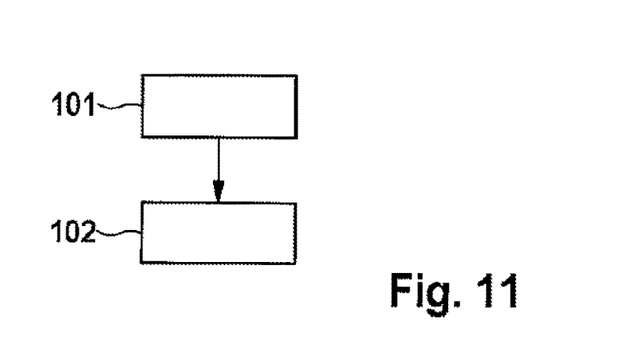
FIG. 11 schematically shows the sequence of a production method for the sensor.

The sensor may be mounted in a production method. Such a production method is represented in FIG. 11.

The sensor core 1, the aligning component 3 and the deviating component 2 may be produced from plastic by an injection-molding method. The sensor core 1 contains inserted parts, for example a sensor unit, a magnet, and/or connecting devices for cables. The assembly may be carried out manually, with the aid of devices or fully automatically.

It is assumed that the sensor core 1 is in a state in which the cable 6 has been brought from the exit direction a into the desired final alignment e, so to speak in a preliminary step of the method. In a first step 101 of the production method, the deviating component 2 is fitted onto the sensor core 1. In this case, as already described, the second ring 11 of the sensor core 1 enters into engagement with the recess 10 of the deviating component 2. With the opening 9b, the deviating component also partially encloses the annular collar 8 which is present on the cable 6. The fitting of the deviating component 2 onto the sensor core may be carried out by means of a tilting movement from above, i.e. from the direction of the cable exit a.

The deviating component 2 may be mounted by a tilting movement such that first the opening 9b is brought into engagement at a slight angle with the annular collar 8 of the cable 6 and is then tilted in the direction of the sensor core 1, the seat 10 in this case being brought into engagement with the second ring 11.

In a subsequent step 102, the aligning component 3 is pushed laterally onto the sensor core 1. In this case, the deviating component 2 is clipped onto the aligning component 3. The lateral pushing is carried out in a mounting direction m which corresponds to the final alignment e of the cable 6. Furthermore, the aligning component 3 enters into engagement with the deviating component 2 by means of the guides 18 and the rails 17. Together with the opening 9b of the deviating component 2, the opening 9a of the aligning component 3 encloses the cable 6 and holds the annular collar 8.

The counter-structure 4 enters into engagement with the aligning structure 5 in an alignment matching with the mounting direction m.

Likewise, the seat 15 of the aligning component 3 enters into engagement with the first ring 14 of the sensor core 1. Furthermore, the seat 16 of the aligning component 3 enters into engagement with the second ring 11 of the sensor core 1.

A representation of the second step of the mounting of the sensor can be seen in FIG. 4. Here, the first step of the production method has been carried out that the deviating component 2 is already placed on the sensor core 1. The aligning component is fitted onto the sensor core 1 as described in the mounting direction, so that the final alignment e of the cable is established.

In this way, a sensor is produced whose cable is in a final alignment e that is established by the mounting of the components, in particular by the mounting direction selected. The final alignment e can be established in relation to the fastening tab 7 of the sensor core 1 by selection of a mounting direction.

What is claimed is:
1. A sensor, comprising:
   a sensor core that includes:
      a cable that leaves the sensor core essentially in an exit direction; and a counter-structure;

a deviating component that is push mounted on and engaged with the sensor core; and an aligning component that includes an aligning structure adapted to and engaged with the counter-structure and that is repositionable relative to the counter-structure in a plurality of different mounting directions relative to the sensor core that are transverse relative to the exit direction, the aligning component is laterally push mounted on the sensor core in one mounting direction of the plurality of different mounting directions;

wherein the deviating component and the aligning component define a final alignment direction of the cable that is different from the exit direction.

2. The sensor of claim 1, wherein the final alignment direction of the cable is based on an angle of the one mounting direction about the exit direction.

3. The sensor of claim 2, wherein the final alignment direction corresponds to the one mounting direction.

4. The sensor of claim 2, wherein:

the sensor core further includes a fastening element that is disposed at a fastening angle about the exit direction;

the final alignment direction is oriented in relation to the fastening element by the one mounting direction; and the fastening element is at a fixed position relative to the sensor core regardless of the one mounting direction.

5. The sensor of claim 1, wherein:

the cable includes an annular collar; and the deviating component and the aligning component each define recesses that are configured to hold the annular collar in order to fix the cable.

6. The sensor of claim 1, wherein:

the sensor core includes a second ring that is disposed around the cable at a first end of the sensor core, said second ring defining the exit direction; and the deviating component defines a seat and at least partially engages with the second ring via the seat.

7. The sensor of claim 6, wherein:

the cable includes an annular collar;

the deviating component and the aligning component each define recesses that are configured to hold the annular collar in order to fix the cable; and a deviation angle between the cable and the exit direction is based on an orientation of the recesses defined by the deviating component relative to the seat.

8. The sensor of claim 1, further comprising:

a connecting arrangement that connects the deviating component and the aligning component to each other.

9. The sensor of claim 6, wherein:

the sensor core further includes a first ring;

the aligning component further includes a first seat and a second seat, the aligning component at least partially engaged with the first ring via the first seat and at least partially engaged with the second ring via the second seat.

10. The sensor of claim 9, wherein the first ring is disposed around the cable between the counter-structure and the second ring.

11. The sensor of claim 1, wherein:

the deviating component includes rails that run along the one mounting direction;

the aligning component further includes guides for and corresponding to the rails; and the aligning component and the guides are configured so as to be engaged with each other in an assembled state of the sensor.

12. A method of producing a sensor, comprising:

mounting a deviating component onto a sensor core that includes (i) a cable leaving the sensor core essentially in an exit direction and (ii) a counter-structure;

mounting an aligning component onto the sensor core and the deviating component by laterally pushing the aligning component in one mounting direction of a plurality of different mounting directions that are transverse relative to the exit direction, the aligning component having an aligning structure adapted to the counter-structure and being repositionable relative to the counter-structure in the plurality of different mounting directions;

engaging the aligning structure with the counter-structure; and defining, via the alignment component and the deviating component, a final alignment direction of the cable that is different from the exit direction.

13. The sensor of claim 5, wherein the recesses defined by the deviating component and the aligning component fully enclose the cable and the annular collar.

14. The sensor of claim 8, where in the connecting member is a latch.

15. The sensor of claim 1, further comprising a fastening element fixedly connected to the sensor core.

16. The sensor of claim 15, wherein the fastening element is an integral component with the sensor core.

17. The method of claim 12, wherein a fastening element is fixedly connected to the sensor core.

* * * * *